United States Patent
Belluomini et al.

(10) Patent No.: US 7,216,141 B2
(45) Date of Patent: May 8, 2007

(54) COMPUTING CARRY-IN BIT TO MOST SIGNIFICANT BIT CARRY SAVE ADDER IN CURRENT STAGE

(75) Inventors: Wendy A. Belluomini, Austin, TX (US); Ramyanshu Datta, Austin, TX (US); Jente Benedict Kuang, Austin, TX (US); Chandler T. McDowell, Austin, TX (US); Robert K. Montoye, Austin, TX (US); Hung C. Ngo, Austin, TX (US)

(73) Assignee: International Business Machines Corporaiton, Armonk, NY (US)

( * ) Notice: Subject to any disclaimer, the term of this patent is extended or adjusted under 35 U.S.C. 154(b) by 727 days.

(21) Appl. No.: 10/702,992

(22) Filed: Nov. 6, 2003

(65) Prior Publication Data
US 2005/0102346 A1    May 12, 2005

(51) Int. Cl.
*G06F 7/50* (2006.01)
(52) U.S. Cl. ..................................... 708/708
(58) Field of Classification Search ............... 708/708, 708/629, 630, 709
See application file for complete search history.

(56) References Cited
U.S. PATENT DOCUMENTS

| | | | |
|---|---|---|---|
| 4,556,948 A * | 12/1985 | Mercy ..................... | 708/625 |
| 5,303,176 A * | 4/1994 | Hrusecky et al. ........... | 708/627 |
| 5,805,491 A | 9/1998 | Bechade | |
| 5,818,747 A | 10/1998 | Wong | |
| 6,415,311 B1 | 7/2002 | Purcell et al. | |
| 6,466,960 B1 | 10/2002 | Winters | |
| 6,567,835 B1 | 5/2003 | Blomgren et al. | |
| 2003/0014459 A1* | 1/2003 | Fletcher ..................... | 708/708 |

* cited by examiner

*Primary Examiner*—Chuong D. Ngo
(74) *Attorney, Agent, or Firm*—Robert A. Voigt, Jr.; Winstead PC

(57) ABSTRACT

A 4-to-2 carry save adder with a reduction in the delay of outputting the sum and carry bits. The 4-to-2 carry save adder may include a lower order full order coupled to a higher order full adder. The carry save adder may further include a logic unit coupled to the higher order full adder where the logic unit is configured to generate a carry bit to be inputted to the higher order full adder that normally would be generated from the carry save adder located in the previous stage. By generating this carry bit (carry-in bit) in the current stage and not in the previous stage, the delay of the carry-in bit inputted to the higher order full adder is reduced thereby reducing the delay of outputting the sum and carry bits by the higher order full adder.

19 Claims, 4 Drawing Sheets

COMPUTING CARRY-IN BIT TO MOST SIGNIFICANT BIT CARRY SAVE ADDER IN CURRENT STAGE

CROSS REFERENCE TO RELATED APPLICATIONS

The present invention is related to the following U.S. Patent Application which is incorporated herein by reference:

Ser. No. 10/702,989 entitled "4-To-2 Carry Save Adder Using Limited Switching Dynamic Logic" filed Nov. 6, 2003.

TECHNICAL FIELD

The present invention relates to the field of carry save adders, and more particularly to a carry save adder that computes the carry-in bit to the higher order full adder in the current stage and not in the previous stage.

BACKGROUND INFORMATION

Carry save adders are often employed in high-speed multipliers, where they generally are able to function more rapidly than "carry propagate" or "ripple carry" adders. A carry save adder is distinguished from other types of adders by the fact that the "carry bits" and half-sum bits (hereinafter referred to simply as "sum bits" for convenience), which result from each addition, are not immediately combined or consolidated but instead are saved separately from each other for subsequent use in the next addition to be performed by the next cascaded carry save adder.

Because a carry save adder does not completely perform the relatively time-consuming process of combining carries with sum bits between successive additions in the multiplication process but instead defers this task until the final cycle of the multiplying operation, they are faster than ripple carry adders.

Typically, carry save adders have multiple inputs, e.g., three inputs, configured to receive multiple numbers, e.g., three numbers, to be added and have two outputs, designated as "sum" and "carry." An example of such a carry save adder is illustrated in FIG. 1. FIG. 1 illustrates what is referred to as a multiple stage "4-to-2" carry save adder 100 that includes multiple carry save adders 101A–B cascaded together. Carry save adders may often be cascaded together where each cascaded carry save adder may be referred to as a stage or cell.

Referring to FIG. 1, as stated above, a multiple stage 4-to-2 carry save adder 100 may include 4-to-2 carry save adders 101A, 101B. 4-to-2 carry save adders 101A, 101B may collectively or individually be referred to as 4-to-2 carry save adders 101 or 4-to-2 carry save adder 101, respectively. 4-to-2 carry save adders 101A, 101B may include full adders 102A–B, 102C–D, respectively, that each receive three inputs and output a carry and a sum bit. Full adders 102A–D may collectively or individually be referred to as full adders 102 or full adder 102, respectively. Full adders 102A, 104C may be referred to as the lower order full adder or carry save adder. Full adders 102B, 102D may be referred to as the higher order full adder or carry save adder.

Referring to 1, full adder 102A of 4-to-2 carry save adder 101A may receive three inputs, designated as A, B and C. Full adder 102A may output a carry and a sum bit, designated as C'out and Sum'. The output, Sum', may be input to the following full adder 102, full adder 102B, of 4-to-2 carry save adder 101A. Full adder 102B may also receive the inputs designated as D and C'in. The carry C'in may refer to the carry out bit, C'''out, generated by carry save adder 101B (lower order full adder 102C) in the previous stage or cell (next lower order bit). Full adder 102B may output a carry bit and a sum bit, designated as C''out and Sum'', respectively.

4-to-2 carry save adder 101B may be configured similarly as 4-to-2 carry save adder 101A. Full adder 102C may receive inputs A', B' and C' and outputting outputs C'''out and Sum'''. The output, Sum''', may be inputted to full adder 102D. Full adder 102D may also receive inputs D' and C''''in where C''''in may refer to the carry out bit generated by the 4-to-2 carry save adder (lower order full adder) in the previous stage or cell (next lower order bit). Full adder 102D may output a carry bit and a sum bit, designated as C''''out and Sum''''.

As illustrated in FIG. 1, the input, C'in, to full adder 102B was generated from full adder 102C of 4-to-2 carry save adder 101B located in the previous stage. Since the signal, C'in, is generated from the previous stage, it takes time to propagate to the current stage and input into full adder 102B of 4-to-2 carry save adder 101A. Due to the propagation delay of signals generated from previous stages, such as signal C'in, the outputs generated by carry save adders, such as full adder 102B, are delayed.

Therefore, there is a need in the art to decrease the delay of the carry-in bit inputted to the higher order carry save adder thereby decreasing the delay of outputting the sum and carry bits and improving the performance of carry save adders.

SUMMARY

The problems outlined above may at least in part be solved in some embodiments by computing the carry-in bit to the high order full adder in the 4-to-2 carry save adder in the current stage than in the previous stage. By generating the carry-in bit in the current stage and not in the previous stage, the delay of the carry-in bit inputted to the higher order full adder is reduced. By reducing the delay of the carry-in bit inputted to the higher order full adder, the delay of outputting the sum and carry bits by the higher order full adder is reduced and hence the performance of carry save adders is improved.

In one embodiment of the present invention, a carry save adder comprises a first full adder and a second full adder coupled to the first full adder. The carry save adder may further comprise a logic unit coupled to the second full adder where the logic unit is configured to compute a carry from a carry save adder located in a previous cell.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a 4-to-2 carry save adder configured to output sum and carry bits. In one embodiment of the present invention, the 4-to-2 carry save adder may comprise a lower order full order coupled to a higher order full adder. The carry save adder may further comprise a logic unit coupled to the higher order full adder where the logic unit is configured to generate a carry bit to be inputted to the higher order full adder that normally would be generated from the carry save adder located in the previous stage. By generating this carry bit (carry-in bit) in the current stage and not in the previous stage, the delay of the carry-in bit inputted to the higher order full adder is reduced. By reducing the delay of the carry-in bit being inputted to the higher order full adder, the delay of outputting the sum and carry bits by the higher order full adder is reduced and hence the performance of carry save adders is improved.

Although the present invention is described with reference to a 4-to-2 carry save adder used in an execution unit in a processor, it is noted that the principles of the present invention may be applied to any type of carry save adder used for addition whether or not the carry save adder is used in an execution unit. It is further noted that embodiments applying the principles of the present invention to such carry save adders would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 2—System

Figure 2:
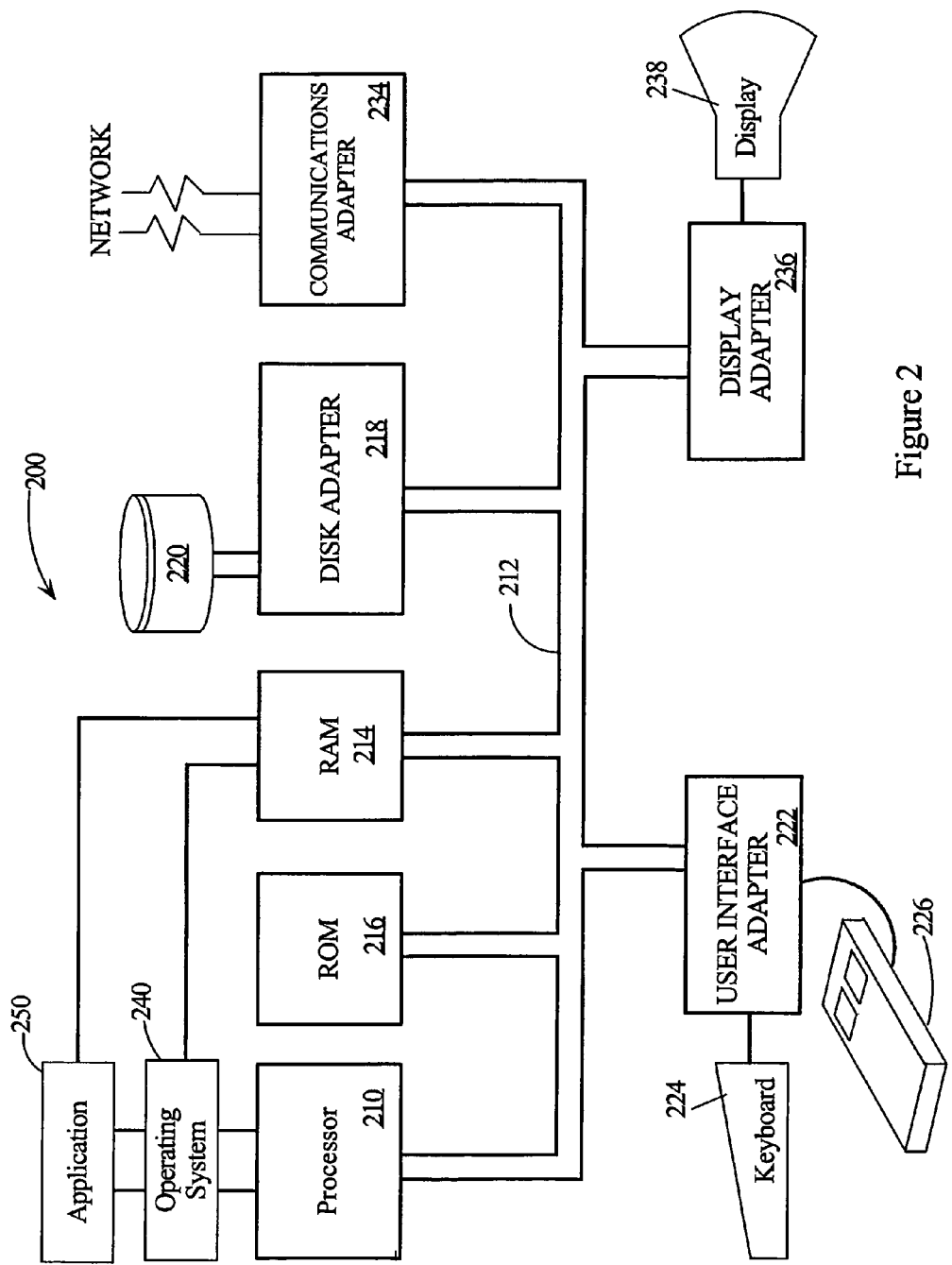
FIG. 2 illustrates a system in accordance with an embodiment of the present invention.

FIG. 2 illustrates a typical hardware configuration of system 200 which is representative of a hardware environment for practicing the present invention. System 200 may have a processor 210 coupled to various other components by a system bus 212. A more detailed description of processor 210 is provided further below in association with FIG. 3. An operating system 240, may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Read-Only Memory (ROM) 216 may be coupled to system bus 212 and include a basic input/output system ("BIOS") that controls certain basic functions of system 200. Random access memory (RAM) 214 and disk adapter 218 may also be coupled to system bus 212. It should be noted that software components including operating system 240 and application 250 may be loaded into RAM 214 which may be system's 200 main memory for execution. Disk adapter 218 may be an integrated drive electronics ("IDE") adapter that communicates with a disk unit 220, e.g., disk drive.

Referring to FIG. 2, system 200 may further comprise a communications adapter 234 coupled to bus 212. Communications adapter 234 may enable system 200 to communicate with other devices over a network. I/O devices may also be connected to system bus 212 via a user interface adapter 222 and a display adapter 236. Keyboard 224 and mouse 226 may all be interconnected to bus 212 through user interface adapter 222. Event data may be inputted to system 200 through any of these devices. A display monitor 238 may be connected to system bus 212 by display adapter 236. In this manner, a user is capable of inputting to system 200 through keyboard 224 or mouse 226 and receiving output from system 200 via display 238.

FIG. 3—Processor

Figure 3:
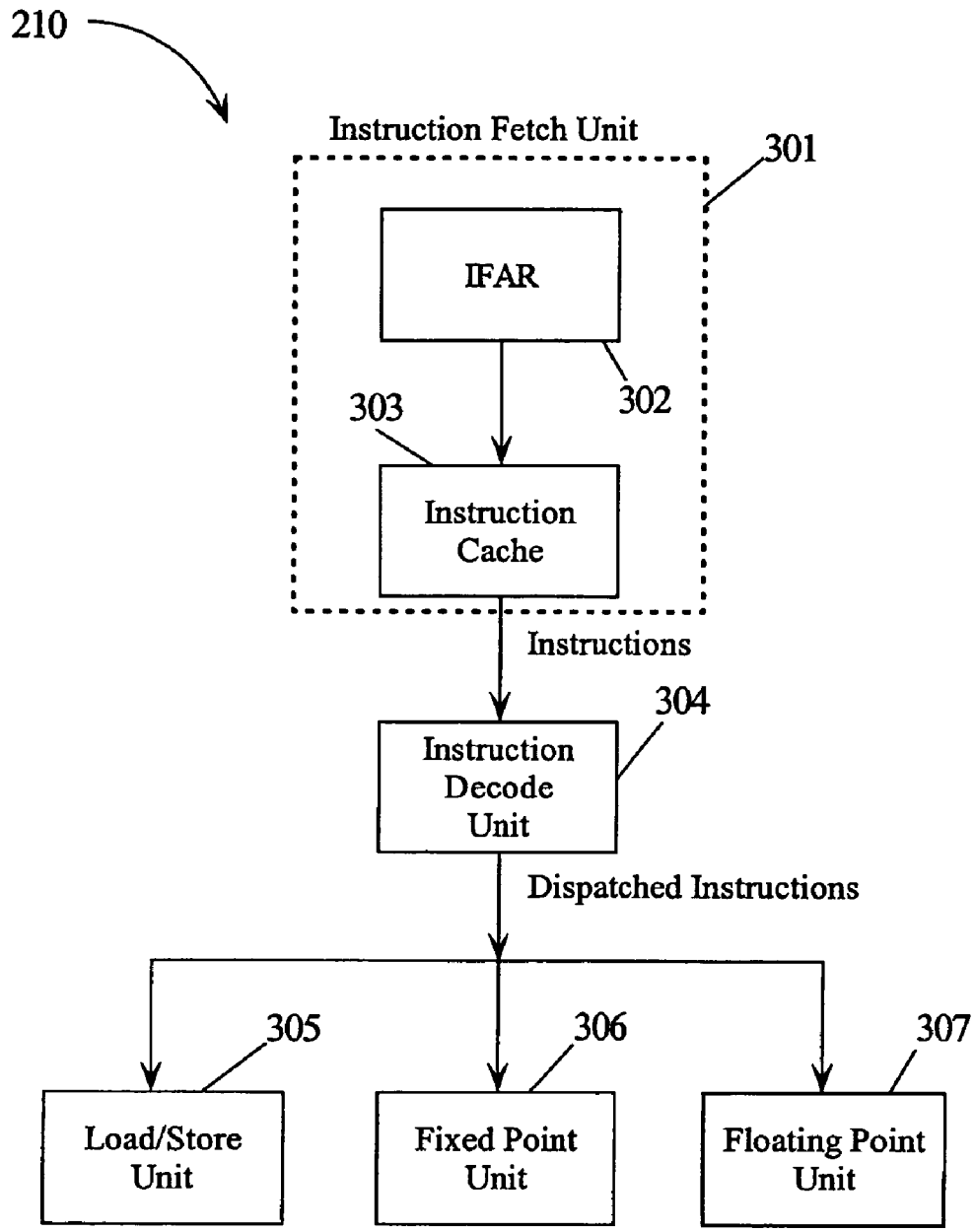
FIG. 3 illustrates an embodiment of the present invention of a processor of the system.

FIG. 3 illustrates an embodiment of the present invention of processor 210 (FIG. 2). Referring to FIG. 3, processor 210 may comprise an instruction fetch unit 301 comprising an instruction fetch address register (IFAR) 302 coupled to an instruction cache 303. Processor 210 may further comprise an instruction decode unit 304 coupled to instruction fetch unit 301. Processor 210 may further comprise execution units: load/store unit 305, fixed point unit 306 and floating point unit 307. It is noted that processor 210 may include other and/or additional units that, for clarity, were not depicted. It is further noted that FIG. 3 is illustrative of an embodiment of processor 210 and FIG. 3 is not to be limited in scope to any one particular embodiment.

Referring to FIG. 3, IFAR 302 may be configured to receive each new instruction address, e.g., effective address representing an address from the program or compiler, such as from program counters (not shown) in system 200 (FIG. 2). The instruction corresponding to the received address may be accessed from instruction cache 303. Instruction cache 303 may be configured to store instructions.

Instructions may be retrieved from instruction cache 303 by instruction decode unit 304 to be decoded. Instruction decode unit 304 may comprise an instruction sequencer (not shown) configured to forward the decoded instructions to particular execution units, as described below, in an order determined by various algorithms. The decoded instructions may be forwarded to execution units: load/store unit 305, fixed point unit 306 and floating point unit 307. Each execution unit may execute one or more instructions of a particular class of instructions. For example, fixed point unit 306 may execute fixed point mathematical and logic operations on source operands, such as adding, subtracting, ANDing, ORing and XORing. Floating point unit 307 may execute floating point operations on source operands, such as floating point multiplication and division. Adding in the addition and multiplication processes may be accomplished in both fixed point unit 306 and floating point unit 307 using 4-to-2 carry save adders. These 4-to-2 carry save adders are discussed below in associated with FIG. 4. Load/store unit 305 may be configured to input information from a data cache (not shown) or a system memory (not shown) in response to a load instruction. Further load/store unit 305 may be configured to output information to a data cache (not shown) or a system memory (not shown) in response to a store instruction.

Figure 1:
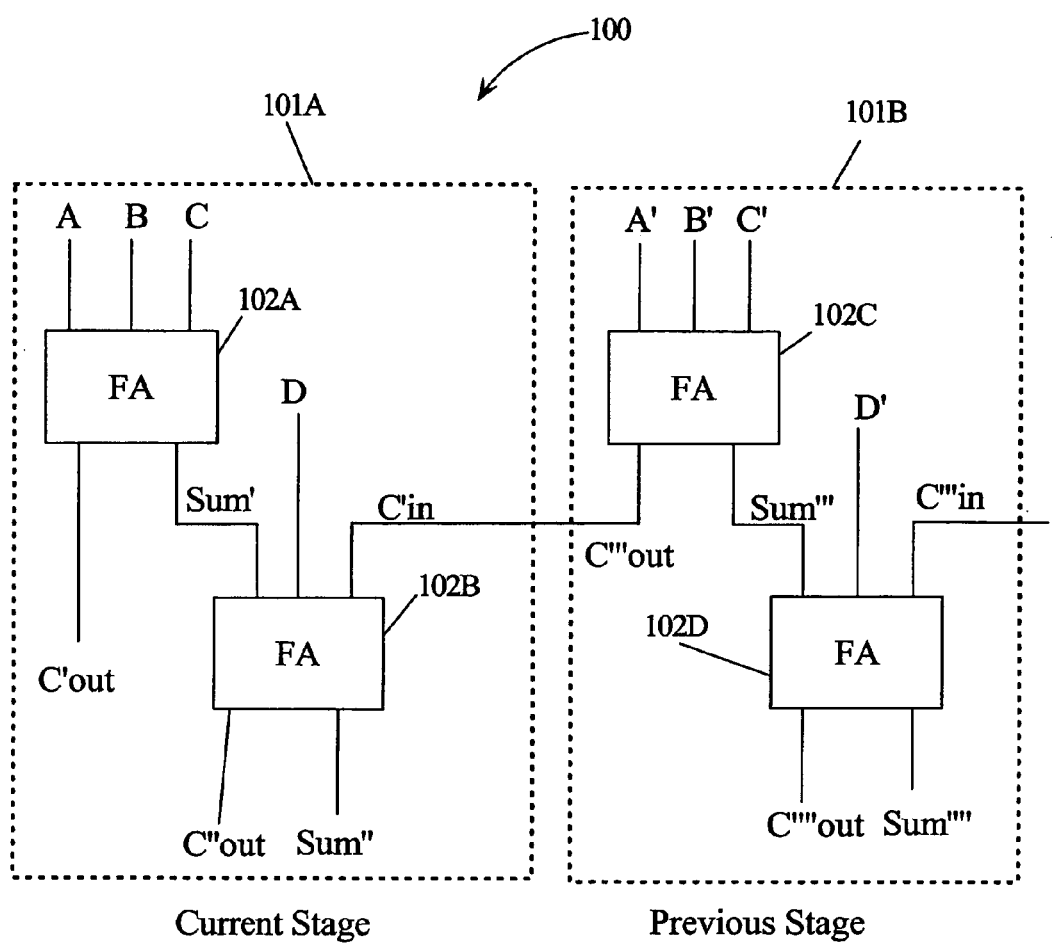
FIG. 1 illustrates a multiple stage 4-to-2 carry save adder.

As stated in the Background Information section, as illustrated in FIG. 1, the input, C'in, to full adder 102B was generated from 4-to-2 carry save adder 101B of the next lower bit. Since the signal, C'in, is generated from the lower order bit, it takes time to propagate to the current stage and input into full adder 102B. Due to the propagation delay of signals generated from other bit positions, such as signal C'in, the outputs generated by carry save adders, such as full adder 102B, are delayed. Therefore, there is a need in the art to decrease the delay of the carry-in bit inputted to the higher order full adder thereby decreasing the delay of outputting the sum and carry bits and improving the performance of carry save adders. A 4-to-2 carry save adder that decreases the delay of the carry-in bit inputted to the higher order full adder is discussed below in association with FIG. 4.

Figure 4:
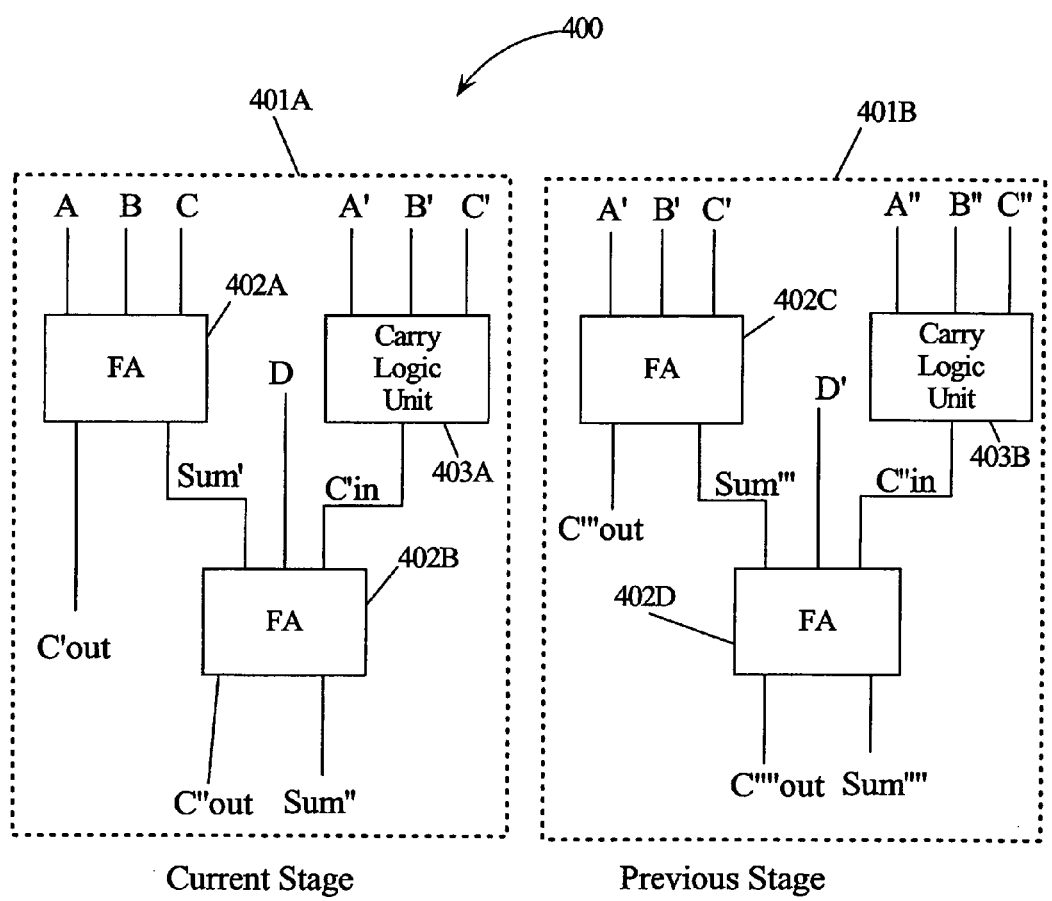
FIG. 4 illustrates a multiple stage 4-to-2 carry save adder in accordance with an embodiment of the present invention.

FIG. 4—Multiple Stage Carry Save Adder

FIG. 4 illustrates an embodiment of the present invention of a multiple stage 4-to-2 carry save adder 400 that decreases the delay of the carry-in bit inputted to the higher order full adder by computing the carry-in bit inputted to the higher order full adder in the higher order full order and not in the next lower order full adder. As stated above, multiple stage 4-to-2 carry save adder 400 may be implemented in fixed point unit 306 or in floating point unit 307. It is noted that multiple stage 4-to-2 carry save adder 400 may be implemented in any execution unit to perform addition in addition and multiplication processes. It is further noted that embodiments incorporating such execution units would fall within the scope of the present invention.

Referring to FIG. 4, multiple stage 4-to-2 carry save adder 400 may include 4-to-2 carry save adders 401A–B. 4-to-2 carry save adders 401A–B may collectively or individually be referred to as 4-to-2 carry save adders 401 or 4-to-2 carry save adder 401, respectively.

4-to-2 carry save adder 401A may comprise full adders 402A–B that each receive three inputs and output a carry and a sum bit. Similarly, 4-to-2 carry save adder 401B may comprise full adders 402C–D that each receive three inputs and output a carry and a sum. Full adders 402A–D may collectively or individually be referred to as full adders 402 or full adder 402, respectively. Full adders 402A, 402C may be referred to as the lower order full adder. Full adders 402B, 402D may be referred to as the higher order full adder.

4-to-2 carry save adders 401A, 401B may further comprise a carry logic unit 403A, 403B, respectively, configured to generate a carry-in bit which is equivalent to the carry-out bit generated from the next lower order bit position. For example, the carry-in bit, indicated as C'in, is equivalent to the carry-out bit generated from the next lower order bit position, indicated as C'''out in FIG. 4. Since this carry-in bit is generated in the current bit position, the delay of the carry-in bit inputted to the higher order full adder 402B is reduced. By reducing the delay of the carry-in bit inputted to the higher order full order 402B, the delay of outputting the sum and carry bits by full adder 402B, as discussed below, is reduced and hence the performance of carry save adders is improved.

Referring to FIG. 4, lower order full adder 402A of 4-to-2 carry save adder 401A may receive three inputs, designated as A, B and C. These inputs are inputted to 4-to-2 carry save adder 401A. Lower order full adder 402A may output a carry and a sum bit, designated as C'out and Sum'. In one embodiment, lower order full adder 402A may output the carry bit, C'out, by performing the majority function on the inputs A, B and C as illustrated in the following formula:

$$C'out = AB + AC + BC \quad (EQ\ 1)$$

where the majority function outputs the value that at least two of the input signals possess. It is noted that the symbol "+", as used herein, indicates the logical addition operation.

It is further noted that it is implied that the logical multiplication operation is performed between inputs listed next to one another, e.g., AB is equivalent to A*B where * is the symbol, used herein, to indicate the logical multiplication operation. For example, if the inputs A and B had a logical value of 1 and the input C had a logical value of 0, then the majority function outputs the logical value of 1.

In one embodiment, lower order full adder 402A may output the sum bit, Sum', by performing the sum function on the inputs A, B and C as illustrated in the following formula:

$$Sum' = A \oplus B \oplus C \quad (EQ2)$$

where the sum function may perform the XOR function, as indicated by $\oplus$, on each of the inputs.

Cary logic unit 403A may output the carry-in bit, C'in, as discussed above, by performing the majority function on the inputs to the next lower order bit, as indicated by inputs A', B' and C'. That is, the inputs from the previous stage, as indicated by A', B' and C', that are inputted to lower order full adder 402C of carry save adder 401B located in the previous stage, are also inputted to carry logic unit 403A. Carry logic unit 403A may then perform the majority function on inputs A', B' and C' as illustrated in the following formula:

$$C'in = A'B' + A'C' + B'C' \quad (EQ3)$$

where the majority function outputs the value that at least two of the input signals possess. For example, if the inputs A' and B' had a logical value of 0 and the input C' had a logical value of 1, then the majority function outputs the logical value of 0.

Referring to FIG. 4, higher order full adder 402B may receive three inputs, designated as Sum', C'in and D. Input D is another input to 4-to-2 carry save adder 401A. Higher order full adder 402B may output a carry and a sum bit, designated as C''out and Sum''. In one embodiment, higher order full adder 402B may output the carry bit, C''out, by performing the majority function on the inputs Sum', C'in and D as illustrated in the following formula:

$$C''out = (A'B'D + A'C'D + B'C'D) + ((A'B'(A \oplus B \oplus C)) + (A'C'(A \oplus B \oplus C)) + (B'C'(A \oplus B \oplus C)) + ((A \oplus B \oplus C)D) \quad (EQ4)$$

where (EQ4) may be reduced to the following:

$$C''out = C'inD + C'inSum' + Sum'D \quad (EQ5)$$

As stated above, the majority function outputs the value that at least two of the input signals possess. For example, if the inputs Sum' and C'in had a logical value of 1 and the input D had a logical value of 0, then the majority function outputs the logical value of 1.

In one embodiment, higher order full adder 402B of 4-to-2 carry save adder 401A may output the sum bit, designated as Sum'', by performing the sum function on the inputs Sum', C'in and D as illustrated in the following formula:

$$Sum'' = Sum' \oplus C'in \oplus D \quad (EQ6)$$

where the sum function may perform the XOR function, as indicated by $\oplus$, on each of the inputs.

Thus, by having carry logic unit 403A generate the carry-in bit, C'in, in the current stage and not in the previous stage, the delay of the carry-in bit inputted to the higher order full adder 402B is reduced. By reducing the delay of the carry-in bit inputted to the higher order fall order 402B, the delay of outputting the sum and carry bits by full adder 402B, Sum" and C"n, respectively, is reduced and hence the performance of carry save adders is improved.

4-to-2 carry save adder 401B is similarly configured as 4-to-2 carry save adder 401A. Full adders 402C, 402D are similarly configured as full adders 402A, 402B, respectively. Full adder 402C may receive inputs A', B' and C' and output a carry bit, designated as C'''out, using EQ1 as well as output a sum bit, designated as Sum''', using EQ2. Carry logic unit 403B is similarly configured as carry logic unit 403A. Carry logic unit 403B may receive inputs A", B" and C" which are the same inputs that are inputted to the lower order full adder of the 4-to-2 carry save adder located in the previous stage (not shown). Carry logic unit 403A may then perform the majority function on inputs A", B" and C" to output a carry bit, designated as C"in, using EQ3. Full adder 402D may receive inputs Sum''', C"in and D" where input D" is inputted to 4-to-2 carry save adder 401B. Full adder 402D may output a carry bit, designated as C""out, using EQ5 as well as output a sum bit, designated as Sum"", using EQ6.

Although the system and carry save adder are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A carry save adder comprising:
   a first full adder;
   a second full adder coupled to said first full adder; and
   a logic unit coupled to said second full adder, wherein said logic unit is configured to compute a carry which uses inputs from a carry save adder located in a previous stage.

2. The carry save adder as recited in claim 1, wherein said logic unit receives a first plurality of inputs from said carry save adder located in said previous stage.

3. The carry save adder as recited in claim 2, wherein said logic unit performs a majority function of said first plurality of inputs.

4. The carry save adder as recited in claim 3, wherein said first plurality of inputs comprises inputs A', B' and C', wherein said majority function of said first plurality of inputs is equal to the equation:

$$A'B'+A'C'+B'C'.$$

5. The carry save adder as recited in claim 3, wherein said first full adder receives a second plurality of inputs of the carry save adder, wherein said first full adder performs a sum function of said second plurality of inputs.

6. The carry save adder as recited in claim 5, wherein said second plurality of inputs comprises inputs A, B and C, wherein said sum function of said second plurality of inputs is equal to the equation:

$$A \oplus B \oplus C.$$

7. The carry save adder as recited in claim 5, wherein said second full adder receives a third plurality of inputs, wherein said third plurality of inputs comprises an output of said first full adder, an output of said logic unit and an input of the carry save adder.

8. The carry save adder as recited in claim 7, wherein said second full adder performs a sum function of said third plurality of inputs.

9. The carry save adder as recited in claim 8, wherein said sum function of said third plurality of inputs is equal to the equation:

said output of said first full adder $\oplus$ said output of said logic unit $\oplus$ D wherein said output of said first full adder is equal to A'B'+A'C'+B'C', wherein said first plurality of inputs comprises inputs A', B' and C';

wherein said output of said logic unit is equal to $A \oplus B \oplus C$, wherein said second plurality of inputs comprises inputs A, B and C, and wherein D is equal to said input of said third plurality of inputs.

10. A system, comprising:
    a memory unit;
    a processor coupled to said memory unit, wherein said processor comprises:
    an instruction unit;
    an execution unit coupled to said instruction unit, wherein said instruction unit is configured to dispatch an instruction to said execution unit, wherein said execution unit is configured to execute said dispatched instruction, wherein said execution unit comprises a carry save adder, wherein said carry save adder comprises:
    a first full adder;
    a second full adder coupled to said first full adder; and
    a logic unit coupled to said second full adder, wherein said logic unit is configured to compute a carry which uses inputs from a carry save adder located in a previous stage.

11. The system as recited in claim 10, wherein said logic unit receives a first plurality of inputs from said carry save adder located in said previous stage.

12. The system as recited in claim 11, wherein said logic unit performs a majority function of said first plurality of inputs.

13. The system as recited in claim 12, wherein said first plurality of inputs comprises inputs A', B' and C', wherein said majority function of said first plurality of inputs is equal to the equation:

$$A'B'+A'C'+B'C'.$$

14. The system as recited in claim 12, wherein said first full adder receives a second plurality of inputs of the carry save adder, wherein said first full adder performs a sum function of said second plurality of inputs.

15. The system as recited in claim 14, wherein said second plurality of inputs comprises inputs A, B and C, wherein said sum function of said second plurality of inputs is equal to the equation:

$$A \oplus B \oplus C.$$

16. The system as recited in claim 14, wherein said second full adder receives a third plurality of inputs, wherein said third plurality of inputs comprises an output of said first full adder, an output of said logic unit and an input of the carry save adder.

17. The system as recited in claim 16, wherein said second full adder performs a sum function of said third plurality of inputs.

18. The system as recited in claim 17, wherein said sum function of said third plurality of inputs is equal to the equation:

said output of said first full adder $\oplus$ said output of said logic unit $\oplus$ D wherein said output of said first full adder is equal to A'B'+A'C'+B'C', wherein said first plurality of inputs comprises inputs A', B' and C';

wherein said output of said logic unit is equal to A⊕B⊕C, wherein said second plurality of inputs comprises inputs A, B and C; and wherein D is equal to said input of said third plurality of inputs.

19. The system as recited in claim 10, wherein said execution unit is a floating point unit.

* * * * *